United States Patent
Kuchler

(10) Patent No.: US 8,577,643 B2
(45) Date of Patent: Nov. 5, 2013

(54) LOCATION DETERMINATION FOR INDIVIDUAL TIRES OF A MULTI-TIRE

(75) Inventor: Gregor Kuchler, Regensburg (DE)

(73) Assignee: Continental Automotive GmbH, Hannover (DE)

( * ) Notice: Subject to any disclaimer, the term of this patent is extended or adjusted under 35 U.S.C. 154(b) by 305 days.

(21) Appl. No.: 12/964,067

(22) Filed: Dec. 9, 2010

(65) Prior Publication Data

US 2011/0153264 A1 Jun. 23, 2011

(30) Foreign Application Priority Data

Dec. 9, 2009 (DE) .......................... 10 2009 057 577

(51) Int. Cl.
*G01C 9/00* (2006.01)

(52) U.S. Cl.
USPC .............................. 702/150; 702/94; 702/127

(58) Field of Classification Search
USPC ............................. 702/94, 127, 150, 155–156
See application file for complete search history.

(56) References Cited

U.S. PATENT DOCUMENTS

| | | | |
|---|---|---|---|
| 2,906,358 A * | 9/1959 | Tucker, Sr. ...................... 180/23 |
| 6,058,996 A | 5/2000 | Suzuki | |
| 7,146,853 B2 | 12/2006 | Fischer et al. | |
| 7,469,578 B2 * | 12/2008 | Matsuda et al. ................. 73/146 |
| 7,822,563 B2 * | 10/2010 | Matsuda et al. ................. 702/41 |
| 2009/0085734 A1 * | 4/2009 | Gila et al. ..................... 340/447 |
| 2009/0243830 A1 | 10/2009 | Heise et al. | |

FOREIGN PATENT DOCUMENTS

| | | |
|---|---|---|
| DE | 4102313 A1 | 7/1992 |
| DE | 69702460 T2 | 11/2000 |
| DE | 10247663 A1 | 4/2004 |
| DE | 102004001250 A1 | 8/2005 |
| DE | 102007010781 A1 | 12/2007 |

* cited by examiner

*Primary Examiner* — Mischita Henson
(74) *Attorney, Agent, or Firm* — Laurence A. Greenberg; Werner H. Stemer; Ralph E. Locher

(57) ABSTRACT

An apparatus and a method are provided for ascertaining the relative position of a first tire and a second tire in a multiple tire. The apparatus may include a first electromechanical transducer providing a first sensor signal indicating a contact area length of the first tire in the multiple tire, and a second electromechanical transducer providing a second sensor signal indicating a contact area length of the second tire in the multiple tire. The apparatus includes a reception unit configured for receiving the first and second sensor signals; a contact area characteristic ascertainment unit ascertaining the contact area lengths characteristic of the first and second tires based on the first and second sensor signals; and a position finding unit ascertaining the position of the first tire relative to the second tire by evaluating the contact length characteristics of the first and second tires during cornering.

17 Claims, 3 Drawing Sheets

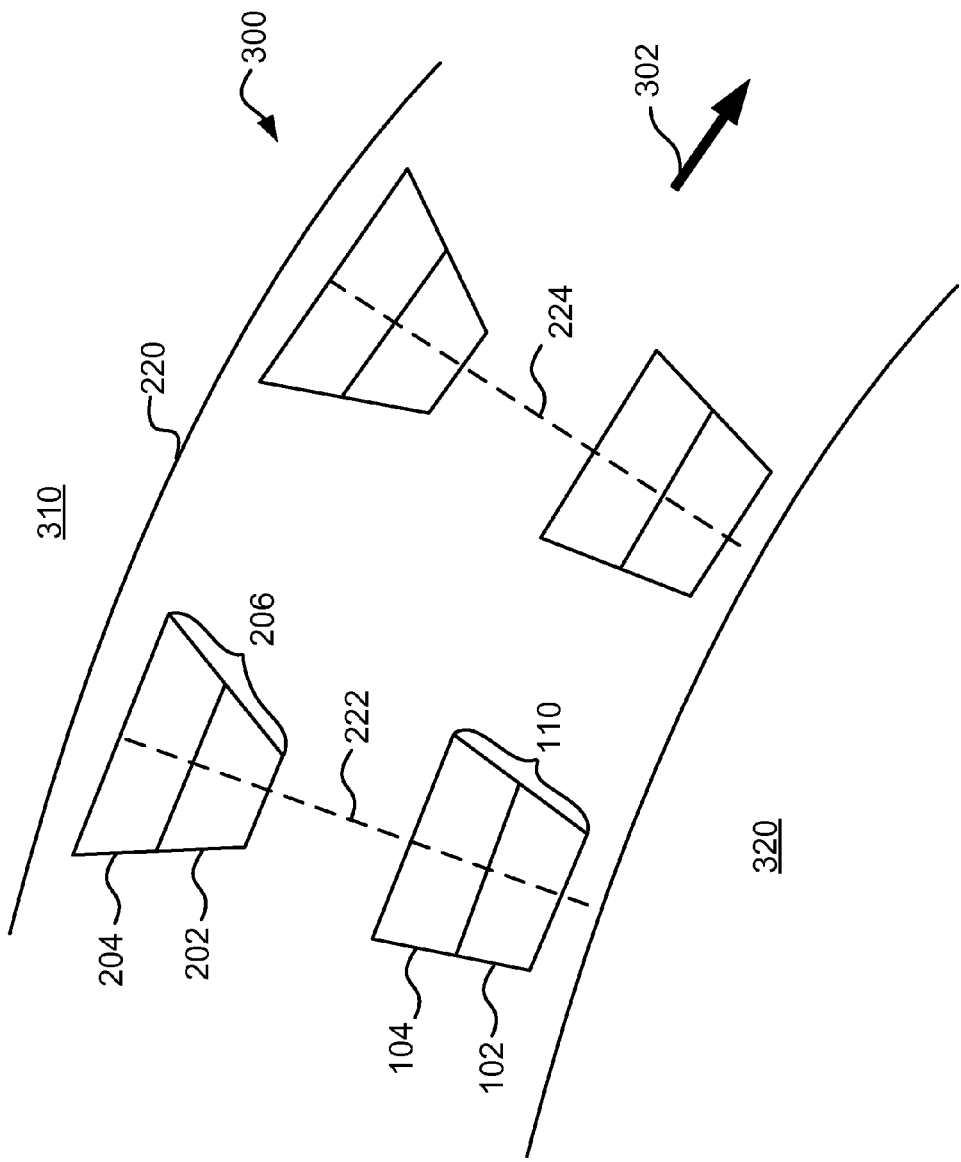

LOCATION DETERMINATION FOR INDIVIDUAL TIRES OF A MULTI-TIRE

BACKGROUND OF THE INVENTION

Field of the Invention

The invention relates to an apparatus for ascertaining a relative position for individual tires in a multiple tire.

The invention also relates to a vehicle.

The invention also relates to a method for ascertaining a relative position for individual tires in a multiple tire.

Furthermore, the invention relates to a program element.

The invention also relates to a computer-readable storage medium.

Modern motor vehicles form complex systems of hardware and software. The regulation and control of the mechatronic system of an automobile involves the use of a large number of very different controllers. Intelligent tire systems also integrate the contact area of a tire into the operation of a motor vehicle.

The contact area of a tire denotes the tire footprint or a magnitude which is indicative of the tire footprint. Such a magnitude is particularly the length of the contact area, that is to say the length measured in the direction of travel, along which the tire is in contact with the road. During travel, the tire footprint on a passenger vehicle is frequently only approximately as large as the palm of a hand. On a motorcycle, it is even smaller. The contact area of a tire, to be more precise the contact area length, can be ascertained by using a piezo element in the tire.

However, the control of a vehicle by vehicle electronics may also require it to be possible to reliably distinguish sensor signals from different piezo elements in different tires from one another.

BRIEF SUMMARY OF THE INVENTION

The invention is based on the object of providing a tire system in which sensor signals from different piezo elements in different tires can be distinguished from one another with feasible complexity and reliably.

This object is achieved by the subject matter of the independent patent claims. Advantageous embodiments of the present invention are described in the dependent claims.

In accordance with a first aspect of the invention, an apparatus for ascertaining a relative position for individual tires in a multiple tire (for example a twin tire) is provided, wherein the apparatus has a reception unit which is set up to receive a first sensor signal from a first electromechanical transducer (for example a first piezo element) associated with a first tire in the multiple tire, wherein the first sensor signal is indicative of a contact area length for the first tire. The reception unit is also set up to receive a second sensor signal from a second electromechanical transducer (for example a second piezo element) associated with a second tire in the multiple tire, wherein the second sensor signal is indicative of a contact area length for the second tire. The apparatus also contains a contact area characteristic ascertainment unit which is set up to take the first sensor signal as a basis for ascertaining a contact area length characteristic (particularly an absolute or relative contact area length, more particularly a contact area length which is associated with a tire footprint) for the first tire and to take the second sensor signal as a basis for ascertaining a contact area length characteristic for the second tire. A position finding unit is set up to ascertain the position of the first tire in relation to the second tire in the multiple tire by evaluating the contact area length characteristic of the first tire and the contact area length characteristic of the second tire, ascertained while the vehicle is cornering.

In accordance with another exemplary embodiment of the invention, a vehicle (for example a motor vehicle, particularly a passenger vehicle or a heavy goods vehicle) having an apparatus with the aforementioned features for ascertaining a relative position for individual tires in a multiple tire is provided.

In accordance with a further exemplary embodiment of the invention, a method for ascertaining a relative position for individual tires in the multiple tire is provided. The method involves a first sensor signal from a first electromechanical transducer associated with a first tire in the multiple tire being received, wherein the first sensor signal is indicative of a contact area length for the first tire. In addition, a second sensor signal from a second electromechanical transducer associated with a second tire in the multiple tire is received, wherein the second sensor signal is indicative of a contact area length for the second tire. A contact area length characteristic for the first tire is ascertained on the basis of the first sensor signal and a contact area length characteristic for the second tire is ascertained on the basis of the second sensor signal. Furthermore, the position of the first tire in relation to the second tire is ascertained by evaluating the contact area length characteristic of the first tire and the contact area length characteristic of the second tire during cornering.

A computer-readable storage medium according to an exemplary embodiment of the present invention stores a program for ascertaining a relative position for individual tires in a multiple tire, which program is set up to perform or control the method having the features described above when it is executed by a processor.

A program element (computer program element) according to an exemplary embodiment of the present invention for ascertaining a relative position for individual tires in a multiple tire has the method steps described above (or controls said method steps or performs them) when it is executed.

Exemplary embodiments of the present invention can be implemented either by means of a computer program, that is to say a piece of software, or by means of one or more specific electric circuits, that is to say in hardware, or in arbitrary hybrid form, that is to say by means of software components and hardware components.

Within the context of this application, a "relative position" between individual tires is understood to mean particularly a piece of information which provides details about the relative arrangement of two tires with respect to one another on a vehicle. By way of example, said information may contain the arrangement of a tire on the left or right, at the rear or front, and in the case of a multiple tire additionally the information whether said tire is situated on the rear inside left or on the rear outside left, for example.

Within the context of this application, the term "multiple tire" is understood to mean particularly an arrangement of two or more tires which are mounted rigidly on one another and are provided directly adjacently to one another, particularly a twin tire or a triplet tire.

Within the context of this invention, the various "units", particularly the reception unit, the contact area characteristic ascertainment unit and the position finding unit, may each be understood to mean a processor or a portion of a processor which performs the respective functions of the relevant unit. Each unit may be in the form of a separate processor, or a plurality of or all units may be in the form of portions of a common processor.

Within the context of this application, the "contact area length characteristic" can be understood to mean a characteristic relating to the tire footprint on a bed, such as a road. In this case, the characteristic of a contact area can denote the surface area or else the geometry of the coverage of the contact area, for example the description of a rectangular or essentially trapezoidal contact area configuration. This may indicate an absolute or preferably a relative (ascertainable with a high level of accuracy) measure of a contact area length.

A "contact area length" can be understood to mean the length of a surface section of a tire which is in contact with a bed such as a road.

An "electromechanical transducer" can be understood, in particular, to mean a transducer which converts mechanical signals such as twists into electrical signals or vice versa. By way of example, an electromechanical transducer element of this kind may be in the form of a piezo element which is mounted on a tire such that it experiences a characteristic sequence of twists upon each contact area pass when the tire is rotating.

In accordance with one exemplary embodiment of the invention, the fact that a contact area geometry and consequently a contact area length characteristic for twin tires are characteristically altered during cornering in comparison with straight-ahead driving can be used to ascertain a relative position between individual tires in the twin tire or electromechanical transducers associated with said tires. This principle can be generalized for triplet tires or generically N-plet tires (N≥2). While a contact area geometry is essentially rectangular during straight-ahead driving, the present inventors have discovered that in the case of twin tires or generically multiple tires the individual tires are each distorted essentially trapezoidally. This distortion has a different extent depending on whether the individual tire in such a multiple tire is situated on the inside of the curve or on the outside of the curve. On the basis of the resulting characteristic, which can be captured by sensors using a respective electromechanical transducer element integrated in the tire, individual sensor signals can be associated with individual tires arranged at particular positions. This may be advantageous from the point of view of desired tire-specific control, for example.

The text below describes additional refinements of the apparatus. These also apply to the vehicle, to the method, to the program element and to the computer-readable storage medium.

The position finding unit may be set up to ascertain the position by evaluating an—during cornering—at least essentially trapezoidal distortion in the contact area of the first tire together with an—during cornering—at least essentially trapezoidal distortion in the contact area of the second tire. On the basis of the forces which act during cornering, particularly centrifugal or centripetal forces, cornering results in distortion of an otherwise at least essentially rectangular geometry of a tire contact area. During cornering, the tires are deformed from the rectangular contact area geometry to an ever greater extent the further away a respective tire is from the center of the curve. On the basis of the correlation between the respective contact area deformations and the corresponding contact area lengths, contact area length analysis allows the arrangement of the respective tire in relation to the center of a curve to be ascertained and hence position-based sorting of the different tires to be performed. Since the manner in which the contact area lengths during cornering change in comparison with the contact area lengths during straight-ahead driving is dependent on the position of an electromechanical transducer on a tire, the position of an electromechanical transducer of this kind should be chosen properly. In many cases, it is expedient for an electromechanical transducer of this kind to be arranged in the center of a tire profile.

In accordance with one exemplary embodiment, the position finding unit may be set up to ascertain, as the position of the first tire in relation to the second tire, which of the first and second tires is the inner-curve tire and which of the first and second tires is the outer-curve tire. A reason for this distinguishability is the dependency of the contact area behavior on centripetal and centrifugal forces.

In accordance with one exemplary embodiment of the invention, the position finding unit may be set up to ascertain the position on the basis of the premise or assumption that during cornering an at least approximately trapezoidal distortion in the contact area of a tire is more pronounced for the outer-curve tire among the first and second tires than for an inner-curve tire among the first and second tires. This may result in a different contact area length, with a lookup table, for example, being able to be used to store an empirical or theoretically derived correlation between the change in the trapezoidal distortion, the position in relation to a curve and an arrangement of the tire on a vehicle. When appropriate sensor signals have been captured, access to such a lookup table can then be used to associate the tires with individual positions. The position finding unit may be set up to ascertain the relative position of the individual tires in the multiple tire by evaluating an alteration in the contact area length of the first tire together with an alteration in the contact area length of the second tire when changing between straight-ahead driving and cornering. The very behavior of a contact area length alteration when changing from straight-ahead driving to cornering or vice versa can provide information about the relative position of the tire with a high level of precision. As an alternative to such measurement of contact area length alterations, it is also possible to use an absolute value for a contact area length ascertained during cornering in order to derive the position information. In the case of yet another exemplary embodiment, it is possible to use a ratio or a difference between contact area lengths of different tires in order to infer the position.

In accordance with one exemplary embodiment, the reception unit may be set up to receive a third sensor signal from a third electromechanical transducer associated with a third tire in another multiple tire, wherein the third sensor signal is indicative of a contact area length for the third tire. The reception unit may also be set up to receive a fourth sensor signal from a fourth electromechanical transducer associated with a fourth tire in the other multiple tire. The fourth sensor signal may be indicative of a contact area length for the fourth tire. The contact area characteristic ascertainment unit may be set up to take the third sensor signal as a basis for ascertaining a contact area length characteristic for the third tire and to take the fourth sensor signal as a basis for ascertaining a contact area length characteristic for the fourth tire. In addition, the position finding unit may be set up to ascertain the position of the third tire in relation to the fourth tire while the other multiple tire is cornering by evaluating the contact area length characteristic of the third tire together with the contact area length characteristic of the fourth tire. In such a configuration, it is possible to sort two twin tires, for example, on a common axle (front axle, rear axle) of a vehicle in respect of the position by evaluating for all four (or more) tires the (absolute or relative) contact area length or the alteration therein during cornering and by associating the derived contact area length alteration characteristic with a position in relation to the curve.

In particular, the position finding unit may be set up to distinguish the respective inner-curve tire in the multiple tire and in the other multiple tire from the respective outer-curve tire in the multiple tire and in the other multiple tire by evaluating the contact area length characteristic of the first and second tires together with the contact area length characteristic of the third and fourth tires during cornering. The basis for this distinction may again be the different characteristic of the behavior of the contact area geometry and hence of the contact area lengths of the individual tires on the basis of a position for the respective tire relative to the center of a curve.

Referring to the exemplary embodiment described previously, the position finding unit may also advantageously be set up such that it identifies the respective inner-curve tire as that tire in the multiple tire and in the other multiple tire whose contact area length is decreasing by evaluating the contact area length characteristic of the first and second tires together with the contact area length characteristic of the third and fourth tires when changing from straight-ahead driving to cornering. The outer-curve tire can be identified as that tire in the multiple tire and in the other multiple tire whose contact area length is increasing. The information "increase or reduction in the contact area length" can therefore be used to safely separate the different multiple tires from one another. Within the multiple tires, a distinction can be drawn between the respective individual tires on the basis of the level to which such an increase or reduction is pronounced.

A respective instance of the electromechanical transducers can generate a sensor signal which is indicative of the contact area length in the center of the respective tire cross section. It has been found that when an electromechanical transducer, for example a piezo element, is arranged in the center (based on an inner-curve edge and an outer-curve edge of the tire) of a tire cross section, the characteristic behavior of said piezo element during cornering is particularly characteristic of the position of the tire.

The contact area characteristic ascertainment unit may be set up to ascertain the respective contact area length characteristic on the basis of the respective sensor signal as a result of a twist in the respective electromechanical transducer during a contact area pass by the tire. If an electromechanical transducer is in the form of a piezo element, said transducer is initially twisted from an untwisted position during a contact area pass, then transferred to an essentially untwisted state and finally twisted again before the twist relaxes again. This results in a timing response for an electrical signal, the length of which between two successive zero crossings is a measure of the contact area length.

In accordance with one exemplary embodiment, the apparatus may be in the form of a tire module. In other words, the apparatus may be provided as a modular component which can be arranged integrally on or in a tire and, by way of example, forwards appropriate tire position information to vehicle electronics. Alternatively, the apparatus may be at least partly in the form of a vehicle electronics module, that is to say directly part of the vehicle electronics.

The inventive distinguishability between individual tires in a twin tire can be combined with one or more further distinctions which, by way of example, permit "front"/"rear" and "left"/"right" distinction. By way of example, the "front"/ "rear" distinction can be made by virtue of the alteration in the contact area length during acceleration or braking behavior being examined. If a vehicle accelerates positively on a straight section, the contact area length for the front tires becomes shorter and the contact area length for the rear tires becomes longer. Hence, it is possible to associate the tires with axles. Alternatively, it is also possible for a radio transmitter (for example a low-frequency transmitter, for example at 125 kHz) to transmit a signal which is captured by sensors on the individual tires. If the radio transmitter is fitted to the rear of a vehicle, the path difference up to the tires results in different detected amplitudes, which allows "front"/"rear" distinction. For the purpose of "left"/"right" distinction, it is possible for acceleration sensors which are offset from one another by an angle (for example 90°) to be fitted to the tires and for the timing response of said acceleration sensors to be ascertained, for example. One of the two sensors lags the other in terms of timing response, which likewise allows association.

The text below describes additional refinements of the vehicle. These also apply to the apparatus, to the method, to the program element and to the computer-readable storage medium.

By way of example, the vehicle may be an automobile (for example a motor vehicle, particularly a passenger vehicle or heavy goods vehicle). Alternatively, it is possible for the inventive tire position capture system to be implemented in a train or the like.

It is pointed out that embodiments of the invention have been described with reference to different inventive subject matter. In particular, some embodiments of the invention are described by means of apparatus claims and other embodiments of the invention are described by means of method claims. However, it will become immediately clear to a person skilled in the art upon reading this application that, unless explicitly stated otherwise, any combination of features which can be attributed to different types of inventive subject matter is also possible in addition to a combination of features which can be attributed to one type of inventive subject matter.

Further advantages and features of the present invention arise from the following exemplary description of currently preferred embodiments. The individual figures of the drawing in this application should be considered merely schematic and not to scale.

BRIEF DESCRIPTION OF THE SEVERAL VIEWS OF THE DRAWING

FIG. 3 shows a vehicle with twin tires during cornering.

DESCRIPTION OF THE INVENTION

Figure 1A:
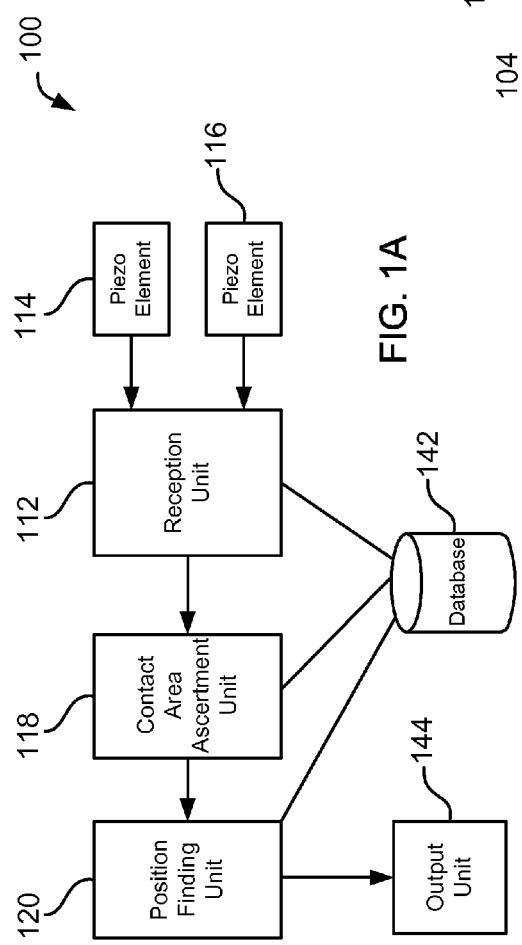
FIG. 1A and FIG. 1B schematically show an apparatus for ascertaining a relative position for individual tires in a twin tire based on an exemplary embodiment of the invention.

Identical or similar components in the different figures have been provided with the same reference numerals.

In accordance with one exemplary embodiment of the invention, a system is provided which allows the position of sensors in twin tires to be resolved essentially without additional technical complexity, that is to say particularly to augment a piece of "rear left" information with the information "rear inside left" or "rear outside left".

The problem can be addressed using technically complex methods, for example LF (Low Frequency) trigger or field-strength measurements. Drawbacks of such systems are in each case a high level of equipment complexity or a high level of application complexity and dependency of the sensitivity for different vehicle variants.

The basis for one exemplary embodiment of the invention is a tire system with the capability of measuring contact area lengths (that is to say the length of the tire footprint on the road) for individual tires. For individual tires, the tire contact area is approximately rectangular when traveling without transverse or longitudinal acceleration. During cornering (transverse acceleration), the rectangular shape is distorted into an approximately trapezoidal shape, with the longer side of the trapezium coming to rest toward the outside of the curve. In the tire module of the system, a (piezo) sensor, for example, measures the contact area length, for example approximately in the center of the tire cross section.

In accordance with the invention, the trapezoidal distortion of an individual tire is advantageously used to locate individual tires in a twin tire. In this case, the effective tire contact area effectively comprises two contact area faces of the two individual tires. The trapezoidal distortion now occurs on both tire contact area faces and is more pronounced overall on the contact area face of the outer-curve tire than on the contact-area face of the inner-curve tire. During cornering, the sensors in the two outer-curve twins now measure increased contact area lengths overall, and the two sensors in the inner-curve twins measure decreased contact area values overall. However, use if now made of the effect that within the two outer-curve twins the outer twin in this case reports an even more seriously increased contact area value in comparison with the inner partner twin. The reason is the trapezoidal distortion which extends over both twins which was addressed above.

In a six-wheel vehicle, for example, the problem arises of sorting the two identities of the "rear left" position according to inner/outer. To this end, the relative changes in the measured contact area lengths are analyzed and a contact area measured value increasing or decreasing to a comparatively greater extent during cornering is associated with the outer twin, and the contact area value increasing or decreasing to a comparatively lesser extent is associated with the inner twin. This analysis of measured values, which are transmitted anyway, in conjunction with available vehicle data allows the additional information to be obtained without additional equipment complexity.

In some cases, the contact area lengths of the tires in absolute form have only limited suitability for comparison with one another. Tolerances in the ascertainment of the absolute contact area length would, in unfavorable cases, make quantitative comparison of contact area lengths, which have been ascertained in different tires by different sensors, difficult or even practically impossible. In such a scenario, it is then advantageous to base a comparison between the signals on relative signals. To this end, the contact area length of each tire is ascertained for straight-ahead driving without acceleration/deceleration—that is to say in a static driving state—, as it were the basic contact area length. During a dynamic driving state (that is to say during a curve or when accelerating or braking), dynamic contact area lengths are then measured and are related to the basic contact area length. It is thus possible to ascertain a measure of the contact area alteration during the dynamic driving state (extension/contraction). This measure of the alteration can now be compared among different tires. Component tolerances, systematic inaccuracies as a result of different assembly, etc. are cancelled out in the approach.

All of these driving-state-dependent functions also work with regularly measuring and transmitting sensors. Although the sensor itself has no knowledge of whether the vehicle is in a static driving state or in a dynamic driving state, the transmissions by said sensor are processed by a receiver and onboard computer which can use the data network of the vehicle to assess the driving state very well (time stamp for reception, back-calculation for the measurement time on the basis of knowledge of the internal sensor processes (AD converter time, processing time, transmission time), retrospection for synchronous vehicle data, such as transverse longitudinal acceleration, engine torque, brake lights, steering wheel angle, etc.) and to evaluate the transmissions by the tire sensors differently in accordance with the driving state. As a result, although the convergence time of the function at vehicle level is sometimes extended somewhat, it is possible to use very simple sensors which are reduced to only the bare necessities and which do not have to perform any complicated data (pre)processing.

One exemplary embodiment of the invention allows the ascertainment results to be used for tire pressure checking. In this connection, it may be advantageous to be able to associate tire pressure sensors in terms of the position thereof.

The text below describes an apparatus 100 for ascertaining a relative position for individual tires 102, 104 in a twin tire 110 based on an exemplary embodiment of the invention with reference to FIG. 1A and FIG. 1B.

Figure 1B:
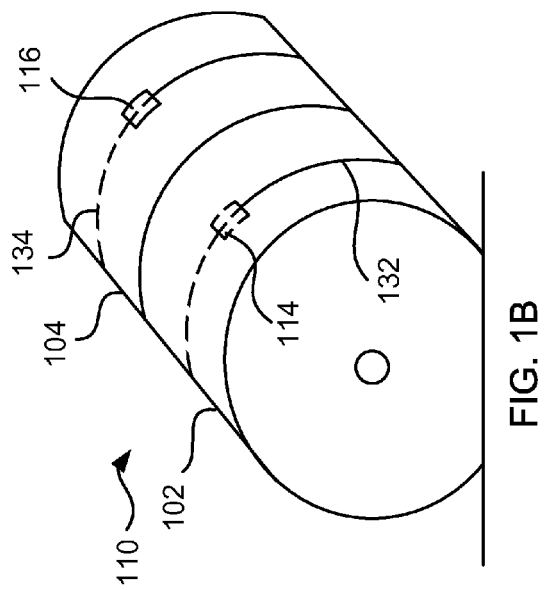

As FIG. 1B shows, the apparatus 100 is based on the first tire 102 being equipped with a piezo element 114 at a tire center position 132. Accordingly, the second tire 104 is equipped with a second piezo element 116 along a tire center position 134.

Figure 1C:
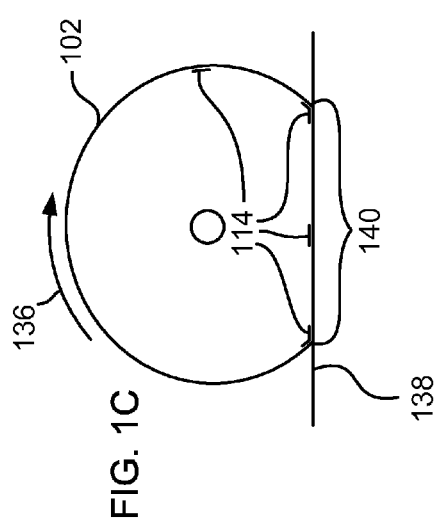
FIG. 1C schematically shows a contact area pass by a tire and a principle for the ascertainment of a contact area length of the basis of a sensor signal from an electromechanical transducer during such a contact area pass.

Using the example of the first tire 102, FIG. 1C shows how the flexural state of the piezo element 114 alters during a contact area pass, that is to say a period between points 2 and 4 in FIG. 1C, when the tire is rotating in a direction 136 and hence a portion of the tire 102 is respectively in contact with a bed 138, such as a road. Before the start of the contact area pass, position 1, the piezo element 114 is unflexed. At the start of the contact area pass, see position 2, the piezo element 114 flexes, which results in an electrical signal. This is followed by a state 3, during which the piezo element 114 is unflexed again before being flexed again at the end of the contact area pass, see position 4. This results in a time-dependent electrical signal from the piezo element 114, for which a distance between two zero crossings is a measure of the contact area length 140.

As FIG. 1A also shows, the electromechanical transducer elements 114 and 116 of a reception unit 112 in the apparatus 100 transmit the respective sensor signals. A first sensor signal from the first tire 102 in the twin tire 110 is supplied to the first electromechanical transducer 114, so that the first sensor signal is indicative of a contact area length for the first tire 102. The reception unit 112 also receives a second sensor signal for the second tire 104 in the twin tire 110, which second tire has the associated second electromechanical transducer 116. This second sensor signal is indicative of a contact area length for the second tire 104.

The reception unit 112 supplies the signal, which can be preprocessed by said reception unit, for example, to a contact area characteristic ascertainment unit 118. The latter is set up to take the first sensor signal as a basis for ascertaining the contact area length characteristic of the first tire 102 and to take the second sensor signal as a basis for ascertaining the contact area length characteristic of the second tire 104. In this case, the contact area length can be ascertained directly, or it is advantageously possible for a parameter value which is indicative of the contact area length, for example a relative value for the contact area length, to be ascertained. As has been described previously, the length of a signal between two zero crossings is characteristic of the respective contact area length.

The ascertained contact area length information is supplied to a position finding unit 120 which ascertains the relative position of the first tire 102 in relation to the second tire 104 by evaluating the contact area length characteristic of the first tire 102 and the contact area length characteristic of the second tire 104. This is based on the fact that, during cornering, the contact area lengths of the tires 102, 104 are altered in different ways, specifically on the basis of how the relative position of the respective tire, to be more precise the respective piezo element 114 or 116, is situated in relation to a curve center point.

As FIG. 1A also shows, a database 142 is provided which the units 112, 118, 120 can access for the purpose of retrieving or storing data. In addition, the position finding unit 120 is coupled to an output unit 144 which can be provided with the result of the position determination. By way of example, the output unit 144 may be a vehicle electronics unit which can use the ascertained positions of the individual tires 102, 104 for control purposes in the vehicle. It is also possible for the output unit 144 to be a graphical user interface which a user can use to become informed about the sensor values for the individual tires. It is also possible for the output unit 144 to initiate a measure directly, for example an alarm, if values are found to be outside an additional tolerance range.

Figure 2:
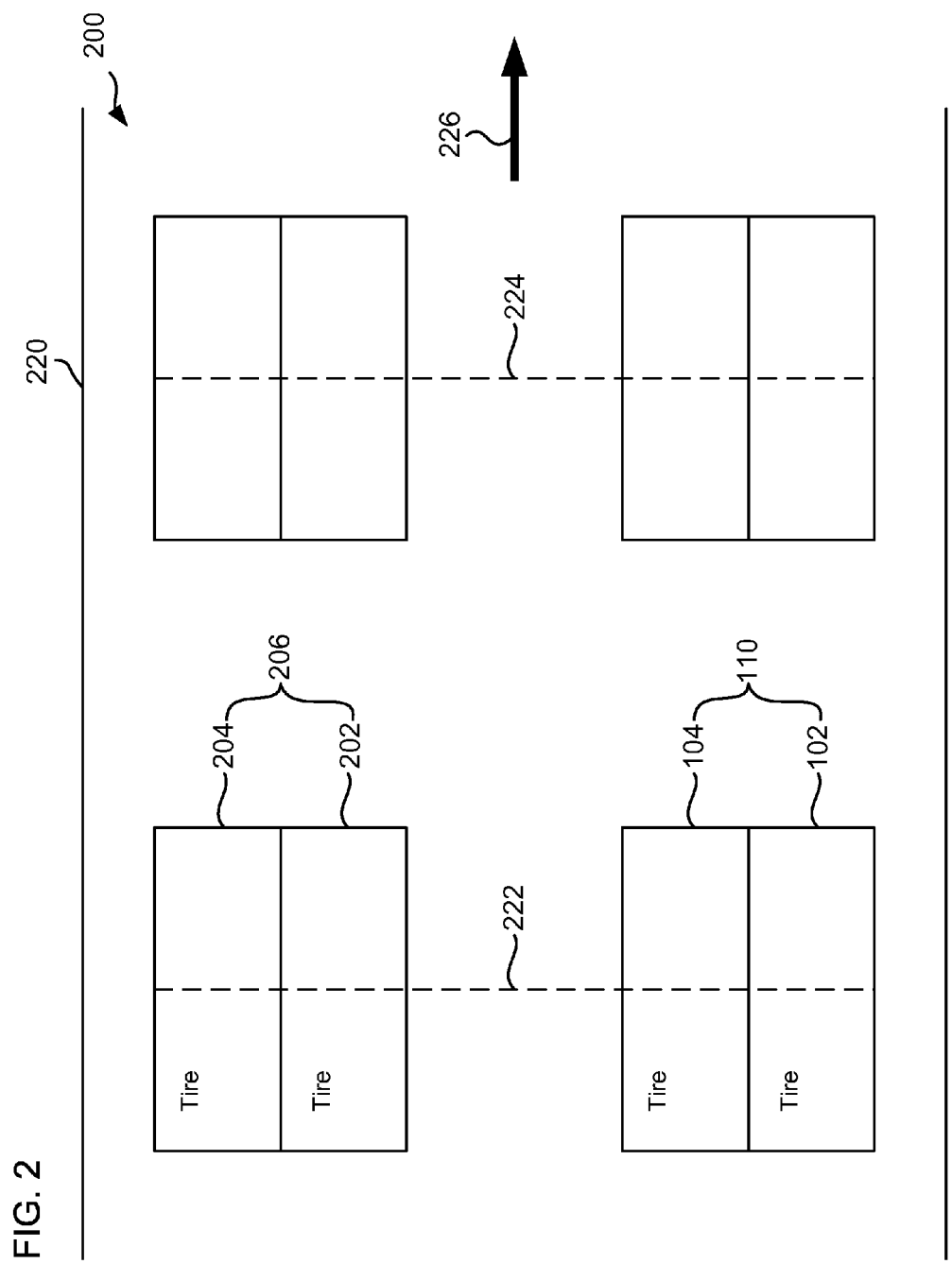
FIG. 2 shows a vehicle with twin tires during straight-ahead driving.

FIG. 2 shows a schematic view 200 of a road 220 on which an automobile—not shown in detail—is moving. Said automobile has a rear axle 222 and a front axle 224 and, in FIG. 2, is moving in a straight line and currently without acceleration in a direction 226. On the rear axle 222, the twin tire 110, which is formed from the directly adjacent individual tires 102, 104, is positioned on the right in FIG. 2. In addition, another twin tire 206, formed from directly adjacent further tires 202, 204, is positioned on the rear axle 222. The individual tires 102, 104 in the twin tire 110 are mounted together and rigidly on one another, as are the individual tires 202, 204 in the other twin tire 206. The two twin tires 110, 206 may either be suspended together on the axle 222 or may be suspended individually and independently. A similar situation applies to the further tires, which may be positioned along the front axle 224 and are not considered in more detail at this juncture.

As FIG. 2 shows, the contact area faces of the tires 102, 104, 202, 204 are essentially rectangular, since straight-ahead driving without acceleration is involved.

FIG. 3 shows another scenario 300 during cornering, in which the road 220 makes a curve. The vehicle is now moving in a cornering direction 302. As FIG. 3 shows, this results in trapezoidal distortion of the contact area faces of the tires 102, 104, 202, 204. Two individual tires 102, 104 in a twin tire form approximately a common trapezium. When considered at high resolution, the two individual tires 102, 104 in the twin tire may have a different trapezoidal distortion such that each individual tire 102, 104 experiences overlaid separate trapezoidal distortion. The individual contact area faces exhibit trapezoidal distortion which is different, however, which means that the measured contact area length of the individual tires is also being altered. It should be noted that the trapezoidal distortions shown in FIG. 3 are merely schematic and not to scale. FIG. 3 shows that the behavior of the tires in an outer-curve region 310 differs from the behavior of the tires in an inner-curve region 320. The distortion is more pronounced on the respective outer-curve tires 204, 104 than on the respective inner-curve tires 202, 102. In addition, the contact area lengths of the two outer-curve twins 204, 202 are increased, whereas those contact area lengths of the inner-curve twins 102, 104 are reduced.

The evaluation of the alteration in the respective contact area lengths of the individual tires 202, 204 and 102, 104 allows explicit association of the individual sensor signals with the position of the respective tires 204, 202, 104, 102.

It is pointed out that the embodiments described here are merely a limited selection of possible variant embodiments of the invention. It is thus possible for the features of individual embodiments to be combined with one another in a suitable manner, so that a person skilled in the art can regard the variant embodiments which are explicit here as disclosing a large number of different embodiments in obvious fashion.

The invention claimed is:

1. An apparatus for ascertaining a relative position of a first tire and a second tire in a multiple tire, the apparatus comprising:
   at least one processor and a non-transitory computer readable medium having a set of computer-readable instructions stored thereon, which when executed by said at least one processor, causes said at least one processor to implement a plurality of units including:
   a reception unit configured for receiving a first sensor signal indicating a contact area length of a first tire in a multiple tire from a first electromechanical transducer associated with the first tire, said reception unit configured for receiving a second sensor signal indicating a contact area length of a second tire in the multiple tire from a second electromechanical transducer associated with the second tire;
   a contact area characteristic ascertainment unit ascertaining a contact area length characteristic of the first tire based on the first sensor signal and ascertaining a contact area length characteristic of the second tire based on the second sensor signal; and
   a position finding unit ascertaining a position of the first tire relative to the second tire in the multiple tire by evaluating the contact length characteristic of the first tire and the contact area length characteristic of the second tire during cornering.

2. The apparatus according to claim 1, wherein:
   the first tire has a contact area and the second tire has a contact area; and
   said position finding unit ascertains the position of the first tire relative to the second tire by evaluating a trapezoidal distortion in the contact area of the first tire during cornering and a trapezoidal distortion in the contact area of the second tire during cornering.

3. . The apparatus according to claim 1, wherein the position of the first tire relative to the second tire indicates which one of the first tire and the second tire is an inner-curve tire and which one of the first tire and the second tire is an outer-curve tire.

4. The apparatus according to claim 1, wherein:
   the first tire has a contact area and the second tire has a contact area; and
   said position finding unit ascertains the position of the first tire relative to the second tire based on a premise that, during cornering, a trapezoidal distortion in the contact area of whichever one of the first tire and the second tire is an outer-curve tire is more pronounced compared to whichever one of the first tire and the second tire is an inner-curve tire.

5. The apparatus according to claim 1, wherein said position finding unit ascertains the position of the first tire relative to the second tire by comparing an alteration in the contact area length of the first tire with an alteration in the contact area length of the second tire when the multiple tire changes between straight-ahead driving and cornering.

6. The apparatus according to claim 1, wherein:
said reception unit receives a third sensor signal from a third electromechanical transducer associated with a third tire in another multiple tire, the third sensor signal indicates a contact area length of the third tire;
said reception unit receives a fourth sensor signal from a fourth electromechanical transducer associated with a fourth tire in the other multiple tire, the fourth sensor signal indicates a contact area length of the fourth tire;
said contact area characteristic ascertainment unit ascertains a contact area length characteristic of the third tire based on the third sensor signal and ascertaining a contact area length characteristic of the fourth tire based on the fourth sensor signal; and
said position finding unit ascertains a position of the third tire relative to the fourth tire in the multiple tire by evaluating the contact length characteristic of the third tire and the contact area length characteristic of the fourth tire during cornering.

7. The apparatus according to claim 6, wherein:
said position finding unit distinguishes an inner-curve tire from an outer-curve tire in the multiple tire by evaluating the contact area length characteristic of the first tire and the contact area length characteristic of the second tire during cornering; and
said position finding unit distinguishes an inner-curve tire from an outer-curve tire in the other multiple tire by evaluating the contact area length characteristic of the third tire and the contact area length characteristic of the fourth tire during cornering.

8. The apparatus according to claim 6, wherein:
said position finding unit distinguishes an inner-curve tire from an outer-curve tire in the multiple tire by evaluating the contact area length characteristic of the first tire and the contact area length characteristic of the second tire, said position finding unit identifies the inner-curve tire in the multiple tire as whichever tire in the multiple tire has the contact area length that is decreasing when changing from straight-ahead driving to cornering, and said position finding unit identifies the outer-curve tire in the multiple tire as whichever tire in the multiple tire has the contact area length that is increasing when changing from straight-ahead driving to cornering; and
said position finding unit distinguishes an inner-curve tire from an outer-curve tire in the other multiple tire by evaluating the contact area length characteristic of the third tire and the contact area length characteristic of the fourth tire, said position finding unit identifies the inner-curve tire in the other multiple tire as whichever tire in the other multiple tire has the contact area length that is decreasing when changing from straight-ahead driving to cornering, and said position finding unit identifies the outer-curve tire in the other multiple tire as whichever tire in the other multiple tire has the contact area length that is increasing when changing from straight-ahead driving to cornering.

9. The apparatus according to claim 1, wherein:
the first tire has a cross sectional area with a center, and the second tire has a cross sectional area with a center;
the first sensor signal generated by the first electromechanical transducer indicates the contact area length in the center of the cross sectional area of the first tire; and
the second sensor signal generated by the second electromechanical transducer indicates the contact area length in the center of the cross sectional area of the second tire.

10. The apparatus according to claim 1, wherein said contact area characteristic ascertainment unit ascertains:
the contact area length characteristic of the first tire based on a twist in the first electromechanical transducer during a contact area pass by the first tire; and
the contact area length characteristic of the second tire based on a twist in the second electromechanical transducer during a contact area pass by the second tire.

11. The apparatus according to claim 1, in combination with the multiple tire, wherein the multiple tire is a twin tire.

12. The apparatus according to claim 1, further comprising said first electromechanical transducer and said second electromechanical transducer.

13. The apparatus according to claim 1, wherein said reception unit, said contact area characteristic ascertainment unit, and said position finding unit form at least part of a tire module.

14. The apparatus according to claim 1, wherein said reception unit, said contact area characteristic ascertainment unit, and said position finding unit form at least part of a vehicle electronics module.

15. A combination, comprising:
a vehicle; and
the apparatus according to claim 1, wherein the apparatus is included in the vehicle.

16. A method for ascertaining a relative position of a first tire and a second tire in a multiple tire, the method which comprises:
with at least one processor, implementing at least a reception unit, a contact area characteristic ascertainment unit, and a position finding unit;
receiving, in the reception unit, a first sensor signal indicating a contact area length of a first tire in a multiple tire from a first electromechanical transducer associated with the first tire;
receiving, in the reception unit, a second sensor signal indicating a contact area length of a second tire in the multiple tire from a second electromechanical transducer associated with the second tire;
ascertaining, in the contact area characteristic ascertainment unit, a contact area length characteristic of the first tire based on the first sensor signal;
ascertaining, in the contact area characteristic ascertainment unit, a contact area length characteristic of the second tire based on the second sensor signal; and
ascertaining, in the position finding unit, a position of the first tire relative to the second tire in the multiple tire by evaluating the contact length characteristic of the first tire and the contact length characteristic of the second tire during cornering.

17. A non-transitory computer-readable storage medium having a set of computer-readable instructions stored thereon, which when executed by at least one processor, causes the at least one processor to implement a plurality of units including:
a reception unit configured for receiving a first sensor signal indicating a contact area length of a first tire in a multiple tire from a first electromechanical transducer associated with the first tire, said reception unit configured for receiving a second sensor signal indicating a contact area length of a second tire in the multiple tire from a second electromechanical transducer associated with the second tire;
a contact area characteristic ascertainment unit ascertaining a contact area length characteristic of the first tire based on the first sensor signal and ascertaining a contact area length characteristic of the second tire based on the second sensor signal; and a position finding unit ascertaining a position of the first tire relative to the second tire in the multiple tire by evaluating the contact length characteristic of the first tire and the contact area length characteristic of the second tire during cornering.

\* \* \* \* \*